UNITED STATES PATENT OFFICE.

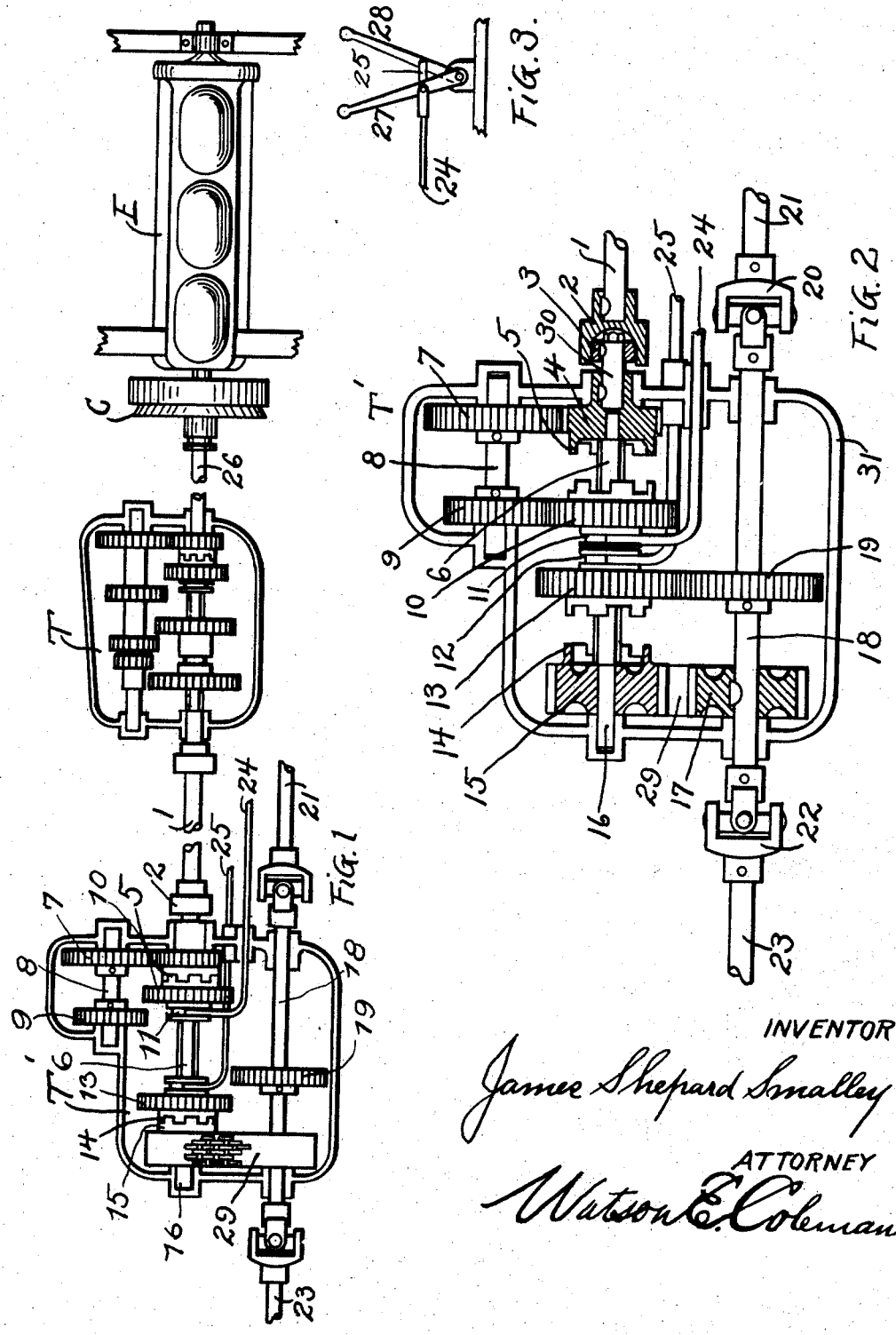

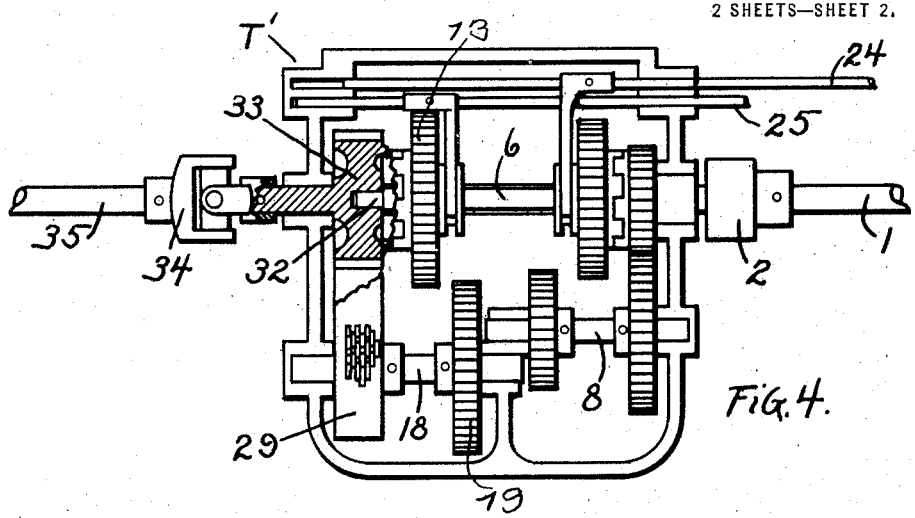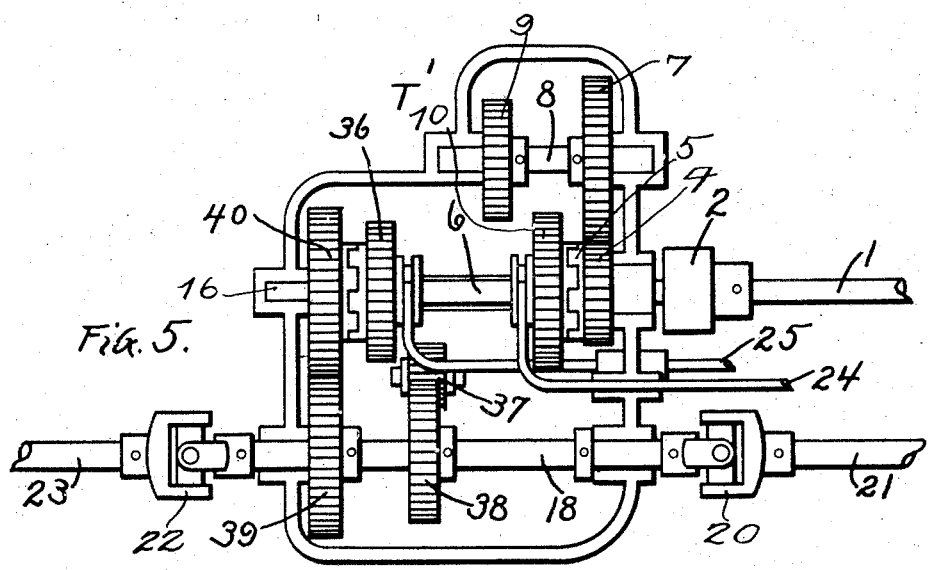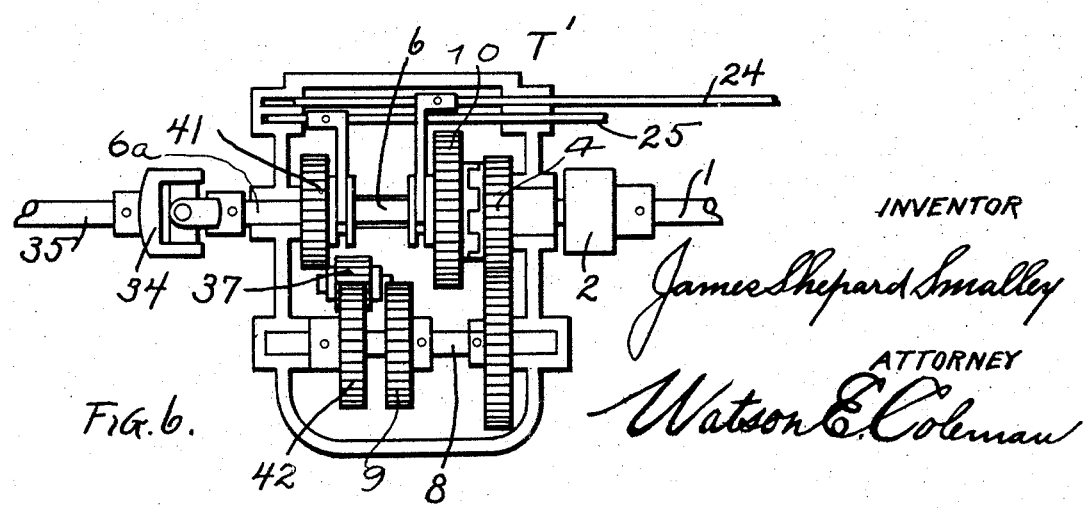

JAMES SHEPARD SMALLEY, OF MUSCATINE, IOWA.

TRANSMISSION.

1,417,950.   Specification of Letters Patent.   Patented May 30, 1922.

Application filed April 27, 1921. Serial No. 464,772.

*To all whom it may concern:*

Be it known that I, JAMES SHEPARD SMALLEY, a citizen of the United States, residing at Muscatine, in the county of Muscatine and State of Iowa, have invented certain new and useful Improvements in Transmissions, of which the following is a specification, reference being had to the accompanying drawings.

This invention relates to improvements in transmissions and has for a particular object thereof the provision of an auxiliary transmission for use in conjunction in a primary transmission free from reverse gearing, the auxiliary transmission being provided with the reverse gearing in order that all speeds of the primary transmission may be available in reverse.

An important object of the invention is to provide not only the above referred to availability of speeds in reversing, but to provide for a considerable enlargement in the range of speeds possible with a direct drive, and to this end the auxiliary transmission likewise embodies at least a two-speed change of each of the speeds received from the main transmission. It will be noted that if the main transmission is provided with four speeds and a two-speed change is provided in the auxiliary transmission, the resultant applied to the power shaft will provide eight changes of speeds.

A further object of the invention is to provide an auxiliary transmission whereby the speed range of the main transmission is enlarged, the auxiliary transmission embodying means whereby any one of the enlarged number of speeds produced may be reversely applied to the driven shaft.

Other objects and advantages of the invention will become apparent throughout the following description.

In the accompanying drawings, wherein for the purpose of illustration are shown preferred embodiments of my invention and wherein like reference characters designate like parts throughout:

Figure 1 is a plan view partially diagrammatic, of a power plant embodying an auxiliary transmission constructed in accordance with my invention;

Figure 2 is an enlarged view partially in section, of the auxiliary transmission;

Figure 3 is a side elevation of the control therefor;

Figures 4, 5 and 6 are views of an auxiliary transmission constructed in accordance with my invention and forming slight modifications of the auxiliary transmission disclosed in Figures 1 and 2.

Referring now more particularly to Figures 1, 2 and 3 of the drawings, the character E designates an engine or source of power connectable by a clutch C with a drive shaft 26 which operates through a transmission T which may be of the usual construction but which is preferably free from reversed gearing. Through this transmission the shaft 1 is driven which is connected by a universal joint embodying portions 2 connected to the shaft 1, and portions 3 connected to the shaft 30 to an auxiliary transmission T' Within the auxiliary transmission T' is a gear 4 secured to the shaft 30 to be driven thereby, this gear being provided upon its side face with a jaw clutch 5. The gear 4 forms a rotatable mounting for one end of a polygonal main shaft 6. In place of the shaft 6, an ordinary shaft provided with a longitudinal key-way may be substituted if so desired. The gear 4 meshes with a large gear 7 mounted upon and secured to a countershaft 8 disposed within the casing of the auxiliary transmission, and this counter shaft has likewise secured thereto a gear 9 relatively smaller than the gear 7. The main shaft has slidably mounted thereon but held against rotation with relation thereto, a gear 10 provided with a jaw clutch adapted to coact with the jaw clutch 5 of the gear 4, and this gear 10 may be selectively engaged with the gear 4 by reason of the coacting jaw clutches, or it may be placed in mesh with the gear 9 so that the main shaft 6 may be either driven directly from the gear 4 and accordingly the main shaft 6 may be driven by the gear 4 through gear 7, shaft 8, gear 9 and gear 10. The gear 10 will be controlled through medium of a shifter fork operating in a hub groove, as indicated by the numeral 24, the forward end of this shifter fork being connected with an operating lever 27 of any desired type.

A second control fork 25 engages in a groove 12 of the gear 13 which is likewise slidably mounted upon the main shaft 6, the action of the fork 25 being likewise controlled by a separate handle 28, so that the gears 10 and 13 may be independently shifted. The gear 13 is provided upon one side face thereof with a jaw clutch coacting with a jaw clutch 14 formed upon a gear 15 rotatably mounted upon a turned down end portion of the shaft, as indicated at 16, this end portion entering into a bearing formed in the casing and forming a rotatable support for this end of the shaft. The gear 15 is of the sprocket order and is connected by a belt or chain 29 of any desired construction, with a second sprocket gear 17 secured to the jack shaft 18 rotatably mounted in the casing of the auxiliary transmission and having its ends projecting therethrough. This jack shaft has likewise secured thereto a gear 19 with which the gear 13 may be meshed, the gear 13 when in mesh with the gear 19 having the jaw clutch thereof out of engagement with the jaw clutch 14 of the sprocket gear 15.

In the operation of this form of the auxiliary transmission the gear 10 may be shifted to bring the jaw clutch thereof into engagement with the jaw clutch 5 of the gear 4, in which instance the main shaft 6 is driven by the gear 4 and at the same speed thereas. While the gear 10 is so engaged, the gear 13 may be engaged either with the gear 19 or with gear 15 through medium of the jaw clutches. In the latter instance the rotation imparted to the jack shaft 18 is a normal or forward motion, and in the former instance the jack shaft is reversed so as to apply to the vehicle a retrograde movement. If it is desired to reduce the ratio afforded by the transmission T, this may be accomplished by shifting the gear 10 so that it meshes with the gear 9, and the main shaft 6 is driven from the gear 4 through the gears 7, 9 and 10. The gear 13 may likewise be shifted to either of its engaged positions while the gear 10 is in this position. This form of drive embodying the two countershafts arranged upon opposite sides of the main shaft in the transmission T' is preferred by reason of the fact that it permits of a double drive being taken from the jack shaft 18, as is diagrammatically illustrated in the drawings by the application to one end of the jack shaft 18, of a universal joint 20 and a shaft 21, and to the opposite end thereof a universal joint 22 and shaft 23.

In the form shown in Figure 4 the countershaft 8 and jack shaft 18 are arranged at the same side of the main shaft 6, and the shaft 6, instead of forming a rotatable mounting for the sprocket gear, has each end thereof provided with a mounting similar to that disclosed in the connection of the main shaft 6 with the gear 4 in Figure 2, the rear end of the shaft being shown in elevation as at 32. The modification of the auxiliary transmission, by placing the counter shaft 8 and jack shaft 18 upon the same side of the main shaft 6, prevents the continuation of the ends of the shaft 18 beyond the casing without unduly enlarging the casing, and the sprocket gear 15 is accordingly substituted for by a second sprocket gear 33 having a shank 33' extending through the casing and affording a securing means for a universal joint 34 by means of which the drive shaft 35 may be attached. This change of construction causes the result of the operation of the gear 13 to be reversed, as connection of the jaw clutch thereof with the jaw clutch of the sprocket gear 33 will cause the drive of the main shaft 6 to be transmitted directly to the shaft 35. When the gear, however, is meshed with the gear 19, the direction of rotation is reversed.

In the form shown in Figure 5, the mountings of the main shaft 6, counter shaft 8 and jack shaft 18 are identical with those shown in Figure 2, the only change in construction from this figure being that the sprocket gears 15 and 17 are substituted by a pair of meshing gears 39 and 40, the gear 39 being secured to the jack shaft 18 and the gear 40 being rotatable upon the reduced end 16 of the main shaft 6. The construction of the gear 36 is not altered in any manner, but the gear 19 is removed from the jack shaft 18 and substituted by a gear 38 with which a reversing pinion 37 is in mesh. The gear 36 when shifted to remove the jaw clutch thereof from engagement with the jaw clutch of the gear 40 meshes with this pinion, causing reverse rotation of the shaft 18, the forward motion of the shaft 18 being obtained through the engagement of the gear 36 with the gear 40.

In the form shown in Figure 6, the end of the shaft 6 extends through the casing, as at 6ª, to form attachment for a universal coupling 34 and driven shaft 35. The jack shaft 18 in this form is eliminated and the counter shaft 8 has mounted thereon a gear 42 meshing with the reversing pinion 37. The main shaft 6 has slidably mounted thereon a gear 41 which may be meshed with the reversing pinion 37 when desired, and the usual gear 10 is likewise provided upon this shaft, since in this form the end of the shaft 6 is utilized for a direct connection of the drive, the meshing of the gear 10 either with the gear 4 or with the gear 9 will cause the driving of the main shaft without any shift of the gear 41, and it will of course be realized that in this form the gear 10 must be in neutral position or out of mesh with either of these gears when the gear 41 is in mesh with the idler reverse pinion 37, and that accordingly independent controls for the control rods 24 and 25 must be eliminated and the operation of these rods made interlocking.

Particular attention is directed to the fact that in each of the views hereinbefore set forth, with the exception of Figure 6, the reverse may be employed with either of the speeds of the auxiliary transmission and may be employed with all of the speeds transmitted through the shaft 1 by the ordinary transmission T, giving in each of these forms a highly increased number of reverse speeds so that the device may readily be employed in driving such devices as internal combustion engine driven railway motor cars and the like where the possibility of a very high range of speeds in both directions is not only desirable but practically necessary. In the forms shown in Figures 2 and 5, or the preferred forms of my device, the structures are particularly well adapted for use in this connection by reason of the fact that the double drive is often necessary in these types of vehicles.

From the foregoing it is believed to be obvious that I have constructed an auxiliary transmission for use either with the ordinary transmission or with a transmission giving a number of speed changes without reverse which is particularly well adapted for use by reason of the fact that it not only multiplies the speed range of the main transmission but permits of reversal of the drive at any given speed. It will furthermore be obvious that the constructions hereinbefore set forth are merely preferred embodiments of my invention and are capable of many changes without materially departing from the spirit of my invention. I accordingly do not limit myself to the specific structures hereinbefore set forth except as hereinafter claimed.

What I claim is:

1. Change speed gearing comprising a main transmission affording a plurality of speed changes, and an auxiliary transmission to which the speed changes are imparted embodying means for changing the speed ratio of each of said speed changes and means for reversing the drive in all of said speed changes.

2. Change speed gearing comprising a main transmission affording a plurality of speed changes, and an auxiliary transmission to which the speed changes are imparted embodying means for changing the speed ratio of each of said speed changes and means for reversing the drive in all of said speed changes, and for reversing the changed speed ratios of such speed changes afforded by the last named means.

3. The combination with a main transmission and a driven element, of an auxiliary transmission adapted for arrangement intermediate the main transmission and the driven element embodying a casing, an element within the casing driven by the main transmission, a main shaft, a jack shaft, means for connecting the main shaft to the element to be driven thereby, and means for connecting the first and jack shafts for rotation in the same or opposite directions.

4. The combination with a main transmission and a driven shaft, of an auxiliary transmission adapted for arrangement intermediate the main transmission and the driven shaft embodying a casing, an element within the casing driven by the main transmission, a countershaft driven by the element, a gear secured to the countershaft, a main shaft axially alined with the element, a gear slidably mounted upon said shaft and held against rotation with relation thereto and adapted to selectively engage with the gear of said countershaft or with said element to be driven thereby, and a connection between said main shaft and the driven shaft whereby said driven shaft may be driven by said shaft either in the same direction as or reverse direction from said main shaft.

5. The combination with a main transmission and a driven element of an auxiliary transmission adapted for arrangement intermediate the main transmission and the driven element embodying a casing, a gear within the casing driven by the main transmission, a shaft axially alined with the gear, a countershaft having a pair of gears one of which meshes with said driven gear, a shiftable gear mounted upon said main shaft and selectively engageable with the other gear of the countershaft or the transmission driven gear, a jack shaft, a member rotatably mounted upon the first shaft, a connection between the member and the jack shaft whereby the jack shaft is driven in the same direction as the main shaft when the member is locked against rotation with relation to the main shaft, and means for locking said member against rotation with relation to said main shaft.

6. The combination with a main transmission and a driven element of an auxiliary transmission adapted for arrangement intermediate the main transmission and the driven element embodying a casing, a gear within the casing driven by the main transmission, a main shaft axially alined with the gear, a countershaft having a pair of gears, one of which meshes with said transmission driven gear, a shiftable gear mounted upon said main shaft and selectively engageable with the other gear of the countershaft or the transmission driven gear, a jack shaft, a connection between the jack shaft and the driven element, a rotatably mounted member axially alined with the main shaft, a connection between the member and the jack shaft whereby the jack shaft is driven in the same direction as the main shaft when the member is locked for rotation with the main shaft, a second gear slidably mounted upon the main shaft and a gear mounted upon the jack shaft, the second gear of the main shaft being selectively engageable with said rotatable member to lock the same against rotation and with said gear of said jack shaft.

7. The combination with a main transmission and a driven element of an auxiliary transmission adapted for arrangement intermediate the main transmission and the driven element embodying a casing, a gear mounted in the casing and driven by the main transmission, a sprocket gear opposing said gear and likewise rotatably mounted in the casing, a main shaft having its ends rotatable within said gears, a pair of gears slidably mounted upon the shaft and held against rotation with relation thereto, one of said gears being adapted for clutched relation with the transmission driven gear and the other of said gears being adapted for clutched relation with said sprocket gear, a countershaft within the casing and embodying a pair of gears one of which meshes with the gear driven by the main transmission, the gear of said shaft which is engageable with said transmission driven gear being engageable with the other gear of said countershaft, a jack shaft having its ends projecting through the casing and engaged with the driven element, a sprocket gear on said jack shaft and connected with the sprocket gear of the main shaft, and a gear secured to said jack shaft and with which the sprocket engaging gear of said main shaft is engageable.

In testimony whereof I hereunto affix my signature.

JAMES SHEPARD SMALLEY.